United States Patent [19]
Joo

[11] Patent Number: 5,913,229
[45] Date of Patent: Jun. 15, 1999

[54] BUFFER MEMORY CONTROLLER STORING AND EXTRACTING DATA OF VARYING BIT LENGTHS

[75] Inventor: Jin-Tae Joo, Seoul, Rep. of Korea

[73] Assignee: Samsung Electronics Co., Ltd., Kyungki-do, Rep. of Korea

[21] Appl. No.: 08/766,461

[22] Filed: Dec. 12, 1996

[30] Foreign Application Priority Data

Dec. 13, 1995 [KR] Rep. of Korea ...................... 95/49339

[51] Int. Cl.[6] .................................................. G06F 9/12
[52] U.S. Cl. ........................ 711/200; 711/109; 711/212; 711/219; 711/220; 341/60; 341/67; 341/101
[58] Field of Search .................................. 711/212, 219, 711/220, 200, 217, 109; 341/67, 101, 60

[56] References Cited

U.S. PATENT DOCUMENTS

| | | | |
|---|---|---|---|
| 4,376,933 | 3/1983 | Saran et al. | 340/347 |
| 4,779,223 | 10/1988 | Asai et al. | 364/900 |
| 5,119,092 | 6/1992 | Sumi et al. | 341/60 |
| 5,146,220 | 9/1992 | Ishikawa | 341/67 |
| 5,276,800 | 1/1994 | Wada | 395/162 |
| 5,309,156 | 5/1994 | Fujiyama | 341/67 |
| 5,321,398 | 6/1994 | Ikeda | 341/67 |
| 5,446,916 | 8/1995 | Derovanessian et al. | 395/800 |
| 5,557,271 | 9/1996 | Rim et al. | 341/67 |
| 5,652,583 | 7/1997 | Kang | 341/67 |
| 5,717,394 | 2/1998 | Schwartz et al. | 341/51 |

OTHER PUBLICATIONS

IBM TDB, vol. 26, No. 10A, Mar. 1984, pp. 4912–4914.

*Primary Examiner*—John W. Cabeca
*Assistant Examiner*—Pierre-Michel Bataille
*Attorney, Agent, or Firm*—Sughrue, Mion, Zinn Macpeak & Seas, PLLC

[57] ABSTRACT

A buffer memory controller allows to sequentially store sampled data having variable bit length. That is, rather than assigning each sampled data to a single word of the memory, the sampled data is sequentially stored head to tail so that memory space is not wasted. The buffer memory controller includes: a sample pointer reading unit providing word addresses indicating the word position where the samples start, and a bit address indicating a bit position where the sample starts; a word shift register receiving data corresponding to the word addresses from the buffer memory, shifting the inputted data by the specific bit according to maximum assignable word, and outputting data of maximum assignable bit; a barrel shifter receiving the output of the shift register, shifting the inputted data by the bit address, and outputting the shifted data as maximum sample bit; and a masking circuit for inputting an output of the barrel shifter, masking the inputted data with mask data in accordance with each bit corresponding to the sample, and outputting the masked data as the maximum sample bit.

6 Claims, 3 Drawing Sheets

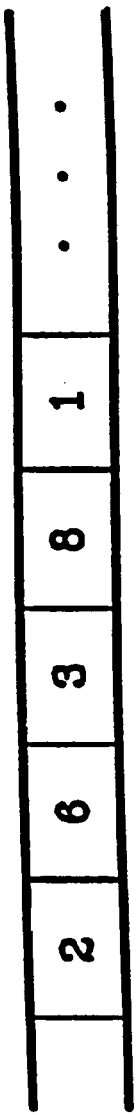
FIG. 4a  n bit
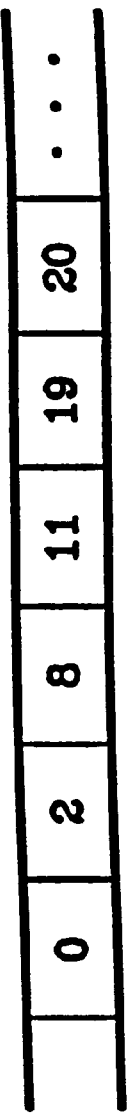
FIG. 4b  STPR
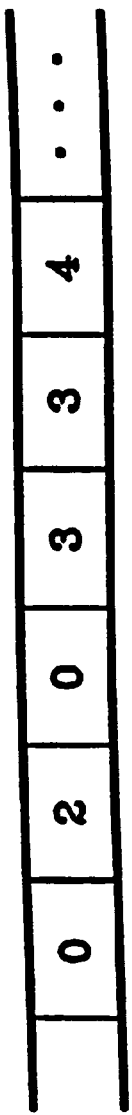
FIG. 4c  BA
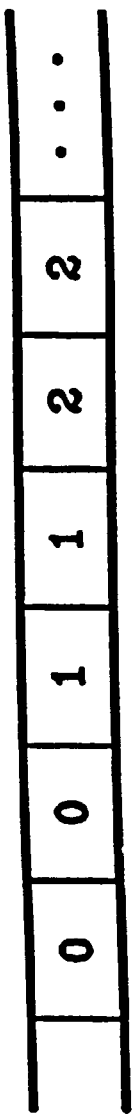
FIG. 4d  A
FIG. 4e  CK
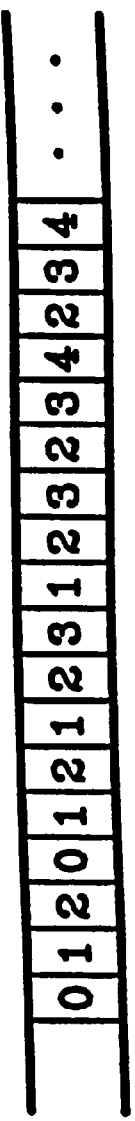
FIG. 4f  WA

BUFFER MEMORY CONTROLLER STORING AND EXTRACTING DATA OF VARYING BIT LENGTHS

BACKGROUND OF THE INVENTION

1. Field of the Invention

The present invention relates to a buffer memory controller and, more particularly, to a controller for sequentially assigning input sample data in a memory, and separating and extracting the sample data stored.

2. Description of the Related Art

Generally speaking, two memories for respectively buffering and processing are required in order to implement a digital audio decoder. FIG. 1 shows the construction of a memory to which sample data are assigned in a bit stream input. For instance, it is observed that five samples of different numbers of bit of the following bit stream are stored in an 8-bit word memory.

TABLE 1

| 2 bit | 6 bit | 3 bit | 8 bit | 1 bit |
|-------|-------|-------|-------|-------|

The size of the memory can be determined by the sample frequency, bit rate, and the number of samples per frame. Herein, the size of the memory is assumed to be 8 bit×1024 words. The number of sample bits corresponds to 2 to 16. Namely, the maximum number of sample bits is 16.

Conventionally, when the buffer memory receives the bit stream exemplified in the above Table 1, it stores the sampled data in a one-word format. In other words, each sampled data is assigned to one word of the memory regardless of the number of bits. Accordingly, memory area is wasted when the sampled data is less than 8 bits.

SUMMARY OF THE INVENTION

Therefore, it is an object of the present invention to provide a buffer memory controller for separating and extracting each sample of a bit stream in a buffer memory, where the sample of the input bit stream is sequentially sliced by a unit of specific bit.

In order to accomplish the object of the present invention, a buffer memory controller is provided for separating and extracting each of the samples stored in the buffer memory, for slicing by a specific bit number, i.e., word size, samples having different bit lengths and being inputted as a bit stream, and sequentially assigning the sliced sample to words in accordance with the specific bit number.

According to a preferred embodiment, the inventive buffer memory controller comprises: a sample pointer reading unit which outputs word addresses indicating word position information of the words that include the desired sample, and a bit address indicating a bit position information where the sample starts; a word shift register receiving from the buffer memory the words corresponding to the word addresses, shifting the inputted data by the specific bit according to maximum assignable word, and outputting data of the maximum assignable bit; a barrel shifter receiving the output of the shift register, shifting the inputted data by the bit address, and outputting the shifted data as maximum sample bit; and a masking circuit receiving the output of the barrel shifter, masking the inputted data with mask data in accordance with each bit corresponding to the sample, and outputting the masked data as the maximum sample bit.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 4a through 4f show the various values of the signals in the controller operating according to the embodiment of FIG. 3.

DETAILED DESCRIPTION OF THE PREFERRED EMBODIMENT

Hereinafter, a preferred embodiment of the present invention will be described in detail with reference to the attached drawings. In the following description, the term "specific bit number" represents the maximum number of bits which can be assigned to one word of the memory. The term "maximum sample bit" indicates the largest bit number of a sampled data which can be extracted, and the term "maximum assignable word" indicates the number of words of the maximum sample bit. In the preferred embodiment of the present invention, the specific bit is 8 bits, the maximum sample bit is 16, and the maximum assignable words is 2.

Figure 2:
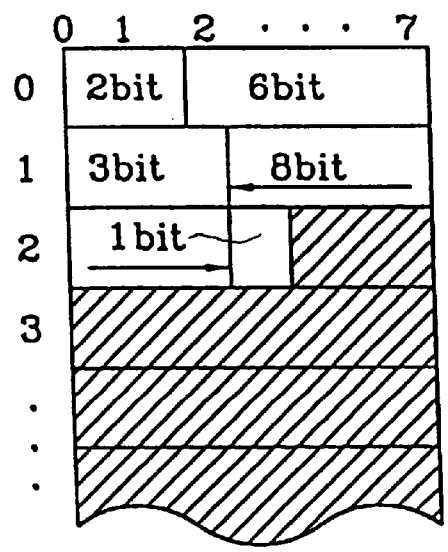
FIG. 2 shows the construction of a memory in which each sample data is assigned from a bit stream input according to the present invention.

FIG. 2 shows the construction of a memory in which each sampled data is assigned from a bit stream input according to the present invention. The construction of FIG. 2 will be explained below.

Figure 1:
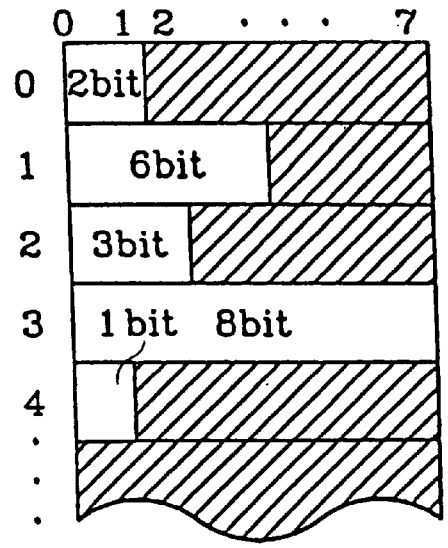
FIG. 1 shows the construction of a memory in which each sample data is assigned from a bit stream input according to the prior art.

The memory of FIG. 2 is of the same size as that of FIG. 1. For purpose of explanation, it is assumed that the bit stream illustrated in the above Table 1 is inputted to the memory of FIG. 2. However, as can be seen from the figures, while the memory of FIG. 1 requires 5 words to store the bit stream of Table 1, that of FIG. 2 requires only 3 words.

To allow the more efficient utilization of memory space, the memory of FIG. 2 requires a controller for separating each of the sampled data, extracting each sampled data and outputting the extracted data. The controller separates the sampled data from the consecutive bit streams by detecting word or bit of a first start position of the respective sample data.

Figure 3:
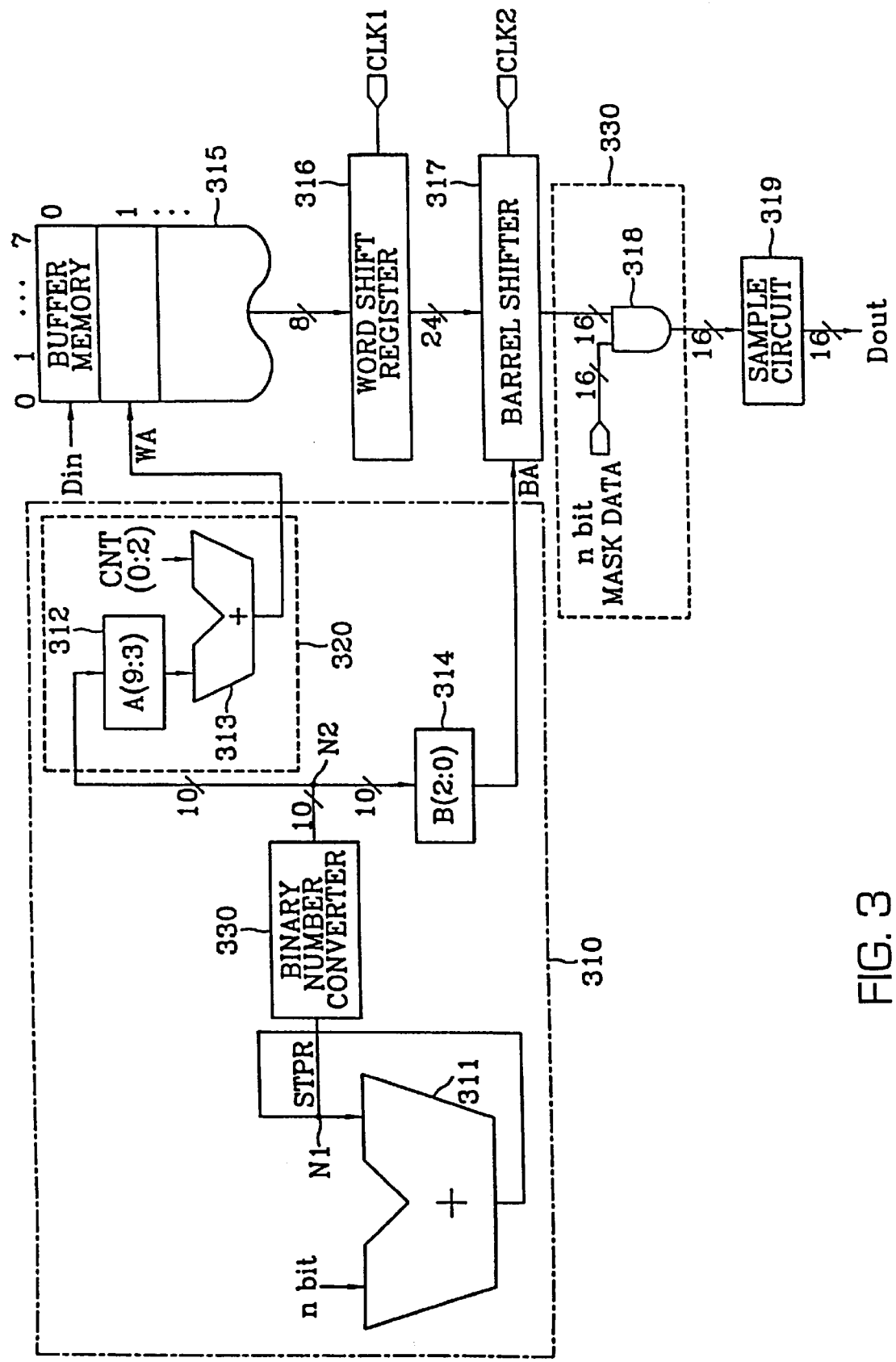
FIG. 3 is a block diagram of a buffer memory controller for separating and extracting each sample data assigned in a memory according to the present invention.

FIG. 3 is a block diagram of a buffer memory controller for separating and extracting each sample data assigned in a memory according to a preferred embodiment of the present invention. Hereinafter, the construction of FIG. 3 will be concretely described assuming the size of the memory to be 8 bit×1024 words.

In FIG. 3, a sample point reading unit 310 is provided for generating a bit address BA as bit position information of the start position of each sample, and a word address WA as word position information. Unit 310 includes the following elements. An accumulator 311 is provided for initially outputting data initialized as 0, and accumulating the sampled bits (n bits). A binary number converter 330 is provided for converting the accumulated data STPR into 10 bits of binary data. A word address generator 320 is provided for shifting the binary number converted data three times, decimalizing the shifted data, sequentially adding the decimalized data to 0, 1 and 2, respectively, and outputting the added data. A bit address generator 314 is provided for reading the 3 least significant bits (LSB) from the binary data of 10 bit and converting the read data into decimal data thus to be outputted.

The word address generator 320 further comprises: a start word address generator A (9:3) 312 for reading 7 bits (ninth to third) from the 10 bit data; and an adder 313 for adding 0, 1, 2 to the output of the start word address generator 312. (From FIG. 4*f* it can be seen that each sequence, e.g., 1, 2, 3, appears twice.) The start word address generator A(9:3) 312 reads from the ninth bit to the third bit among the 10 bits, decimalizes and outputs the result. The bit address generator B(2:0) 314 reads and outputs from the second bit to the 0th bit among the 10 bits. The binary number converter 330, the word address generator 320 and the bit address generator B(2:0) 314 in effect read a quotient and remainder obtained by dividing the accumulated data STPR by 8.

Upon receiving the word address WA, the buffer memory 315 outputs a word corresponding to the word address WA to the word shift register 316 on basis of first clock signal CLK1. During an extraction operation, the word shift register 316 sequentially receives three words of the sampled data on basis of three clock signals, and outputs three words totaling 24 bit data. In this instance, the word shift register 316 is embodied as 24 bits, the maximum assignable bits, because in this embodiment one sample can be stored in anywhere from one word to three words.

In a barrel shifter 317, in synchronization with second clock signal CLK2 of a frequency three times that of the first clock signal CLK1, the 24 bit data is shifted to the left as many as the bit address BA, to be outputted as 16 bit data. Therefore, the leftmost bit of the data output from the barrel shifter 317 is the bit in which each of the sampled data starts.

A masking circuit 330 is constructed with an AND gate 318 which receives the data of the barrel shifter 317 and 16 bit mask data for the number of bits of the sample data. Its output data Dout is sample data of 16 bits.

FIGS. 4*a* through 4*f* show the signals in the controller when operating according to the embodiment of FIG. 3. In the following, the steps for separating and extracting the fourth sample from the memory of FIG. 2 is explained. Reference is made to FIGS. 3 and 4*a*-*f*. As shown in the aforesaid Table 1, the fourth sample has eight bits.

The accumulator 311, receiving n sample bits, applies the accumulated data STPR to a node N1. When the eight bits of the fourth sampled data are input (FIG. 4*a*), the accumulated data STPR output from the accumulator 311 corresponds to 11 (see FIG. 4*b*). In the case that this is binarized in the binary number converter 330, the accumulated data corresponds to 0000001011. This is applied to a node N2 and to the start word address generator 312 and the bit address generator 314. Data A output from the start word address generator 312 becomes 1 (FIG. 4*d*), while the word address WA as the data output from the adder 313, becomes, 1, 2, 3 (FIG. 4*f*). Data BA output from the bit address generator 314 becomes 3 (FIG. 4*c*). Then, the word shift register 316 receives three words, respectively having the word addresses 1, 2, 3. The 24 bit data is applied to the barrel shifter 317. The applied data is shifted to the left 3 bit slots corresponding to the bit address BA, so that the first bit of the eight bits can be positioned leftmost in the barrel shifter 317.

The AND gate 318 ANDs eight bit mask data, 1111111100000000, and 16 bits from the left. As the output data of AND gate 318, only eight bits of sample data are output and applied to a sample circuit 319, which then samples them. The sample point reading unit 310 detects that the eight bit data starts from the word of address 1, and the bit of address 3. Accordingly, only the eight bit sample data is extracted which starts from the bit of address 3 in the word of address 1, and ends at the bit of address 2 in the word of address 2.

For clarity, another example will be given with reference to FIGS. 2 and 4*a*-*f*. Assuming that the three bits sample stored beginning on bit address "0" of word address "1" is to be extracted (FIG. 2), STPR will assume the value 8. Consequently, the bit address BA assumes the value "0", as shown in FIG. 4*c*, and the word address WA assumes the values 1, 2 and 3, as shown in FIG. 4*f*. Since WA assumes the values 1, 2 and 3, three words having the values 1, 2 and 3 are transferred from the buffer memory 315 into the word shift register 316 (FIG. 3). However, since the value of BA is "0", the data is not shifted in the barrel shifter 317.

As described above, the present invention is able to effectively reduce the size of the memory by slicing the input bit stream by eight bits, and then storing it in a memory of eight bit words. In order to separate the samples stored in the memory, the number of bits of each sample are accumulated in the sample pointer so that the address of the memory and the position of the first bit of the sample in the word can be found.

It should be understood that the present invention is not limited to the particular embodiment disclosed herein as the best mode contemplated for carrying out the present invention, but rather that the present invention is defined in the appended claims.

What is claimed is:

1. A buffer memory controller for separating and extracting samples having different bit lengths and being inputted to a buffer memory as a bit stream, comprising:

a sample pointer reading unit receiving the bit stream and outputting word addresses indicating position of words where an extracted sample is stored, and a bit address indicating a bit position where said extracted sample starts;

a word shift register receiving data corresponding to said word addresses from said buffer memory, and shifting said data according to a specific bit number to outputting data of maximum assignable bit;

a barrel shifter receiving said data of maximum assignable bit, shifting said data of maximum assignable bit by said bit address, and outputting the result as maximum sample bit; and a masking circuit receiving said maximum sample bit, masking said maximum sample bit with mask data in accordance with each bit corresponding to said extracted sample, and outputting the result as said extracted sample.

2. The controller as claimed in claim 1, further comprising a sample circuit for sampling an output of said masking circuit and outputting said extracted sample.

3. The controller as claimed in claim 1, wherein said sample pointer reading unit comprises:

an accumulator receiving and accumulating sample bits corresponding to said samples, and outputting a signal indicating the value of the accumulated data;

a calculator receiving said signal and calculating a divided value in which said value of the accumulated data is divided by said specific bit number;

an adder for sequentially adding values from 0 to said value of the maximum assignable data to said divided value and generating said word address; and a bit address generator for generating said bit address.

4. A buffer memory controller for separating and extracting samples stored in a buffer memory by slicing to 8 bit samples having different bit lengths but being inputted as a continuous bit stream, and sequentially assigning the sliced samples to words of 8 bits, comprising:

- a sample pointer reading unit for identifying the samples from the bit stream and providing addresses indicating word positions of words containing said samples, and providing a bit address indicating a bit position information where each sample starts;
- a word shift register receiving from said buffer memory data corresponding to said word addresses, and shifting the inputted data by 8 bits according to maximum assignable word, and outputting data of 24 bits;
- a barrel shifter receiving the 24 bits output from said word shift register, shifting said 24 bits by said bit address, and outputting the result as 16 bits;
- a masking circuit receiving the 16 bits output from said barrel shifter, masking said 16 bits with mask data in accordance with each bit corresponding to an extracted sample data, and outputting the 16 bit masked data; and
- a sample circuit for sampling output from said masking circuit and outputting said extracted sampled data.

5. The controller as claimed in claim 4, wherein said sample pointer reading unit comprises:

- an accumulator receiving and accumulating sample bits corresponding to said samples, and outputting accumulated data;
- a converter for converting said accumulated data into binary data of 10 bit;
- a word address generator for shifting said binary data to the left three times, decimalizing the shifted data, and consecutively adding a value from 0–3 to said decimalized data, and generating said word address; and
- a bit address generator for generating said bit address from the three least significant bits of said binary data.

6. The controller as claimed in claim 4, wherein said sample pointer reading unit comprises:

- an accumulator receiving and accumulating sample bits corresponding to said samples and outputting accumulated data;
- a calculator receiving said accumulated data and calculating a divided value corresponding to the accumulated data divided by 8 bits;
- an adder for adding a value from 0 to 3, to said divided value to generate said word address; and
- a bit address generator receiving said divided value and generating said bit address.

* * * * *